United States Patent [19]
Hall et al.

[11] Patent Number: 5,272,207
[45] Date of Patent: Dec. 21, 1993

[54] PROCESS FOR CONTINUOUSLY PRODUCING CYCLICLY TAPERED SBR-TYPE COPOLYMERS

[75] Inventors: James E. Hall, Mogadore; David M. Roggeman, North Royalton, both of Ohio

[73] Assignee: Bridgestone Corporation, Tokyo, Japan

[21] Appl. No.: 829,854

[22] Filed: Jan. 31, 1992

[51] Int. Cl.⁵ ...................... C08F 297/04; C08L 53/02
[52] U.S. Cl. ...................................... 525/89; 525/250; 525/271; 525/314
[58] Field of Search .................. 525/271, 314, 250, 89

[56] References Cited

U.S. PATENT DOCUMENTS

| | | |
|---|---|---|
| 3,937,760 | 2/1976 | Cole et al. ............................ 525/271 |
| 4,704,434 | 11/1987 | Kitchen et al. ...................... 525/271 |

*Primary Examiner*—Jacob Ziegler
*Attorney, Agent, or Firm*—Frank J. Troy, Sr.

[57] ABSTRACT

A process is discontinuously preparing continuously tapered SBR-type copolymers optionally having a continuous change in microstructure along the polymer. The process produces tapered block copolymers with multiple glass transition temperatures of very small energy absorption, i.e. no definable glass transition temperature.

12 Claims, 1 Drawing Sheet

PROCESS FOR CONTINUOUSLY PRODUCING CYCLICLY TAPERED SBR-TYPE COPOLYMERS

FIELD OF THE INVENTION

This invention relates generally to processes for continuously producing a mixture of cyclicly tapered rubbery SBR-type copolymers displaying no specific $T_g$ and to the copolymer compositions produced thereby.

BACKGROUND OF THE INVENTION

In a paper presented at the spring meeting of ACS Rubber Division held on May 8-11, 1984 in Indianapolis, Ind., Dr. K. H. Nordsiek discussed model studies for the development of an ideal tire tread rubber. The postulated ideal rubber for tire tread is not capable of description by a characteristic glass transition temperature, $T_g$, which is considered a useful physical criterion for determining the characteristics of amorphous rubbers. Instead, the ideal rubber represents the sum of a large number of different block structures having varying $T_g$ values.

Batch polymerization of 1,3-butadiene monomers with styrene monomers in the presence of an anionic initiator yields a block copolymer having a slight taper due to differences in the reactivity of the monomers. However, there are still two sharp glass transition temperatures associated with formation of both a mostly polybutadiene block and a mostly polystyrene block.

Batch polymerization of 1,3-butadiene monomers with styrene monomers in the presence of an anionic initiator and a modifier also leads to a taper in the 1,2-microstructure of the butadiene segments when the polymerization temperature is permitted to rise adiabatically. However, the styrene distribution is fairly uniform and the butadiene microstructure taper is dependent on many factors including: the total change in temperature, $\Delta T$; the initial and maximum reaction temperatures; and the degree of polymerization conducted at each temperature. A distinct $T_g$ is present for these polymers. It is therefore desirable to precisely control tapering and prepare a postulated ideal rubber for use as tire tread in a continuous process.

It is therefore an object of the present invention to provide a continuous process for the production of a styrene-butadiene type copolymer having a continuously tapered structure and possessing no specific $T_g$ values.

SUMMARY OF THE INVENTION

A process for continuously copolymerizing in a solvent a diene monomer and a vinyl aromatic monomer in the presence of an anionic initiator and a modifier is provided. By continuously adjusting the ratio of the vinyl aromatic monomer to the diene monomer, while adjusting or maintaining the ratio of the modifier to the initiator throughout the process, a continuously tapered copolymer having a continuously changing, preferably increasing or decreasing, vinyl aromatic content and a continuously changing or stable 1,2-microstructure (vinyl content) along its chain length is prepared. The copolymers prepared herein possess varying flexibility along the chain length and all copolymers produced herein are characterized by displaying multiple glass transition temperatures of small energy absorption, i.e., no definable glass transition temperature.

DETAILED DESCRIPTION OF THE PREFERRED EMBODIMENTS

Figure 1:
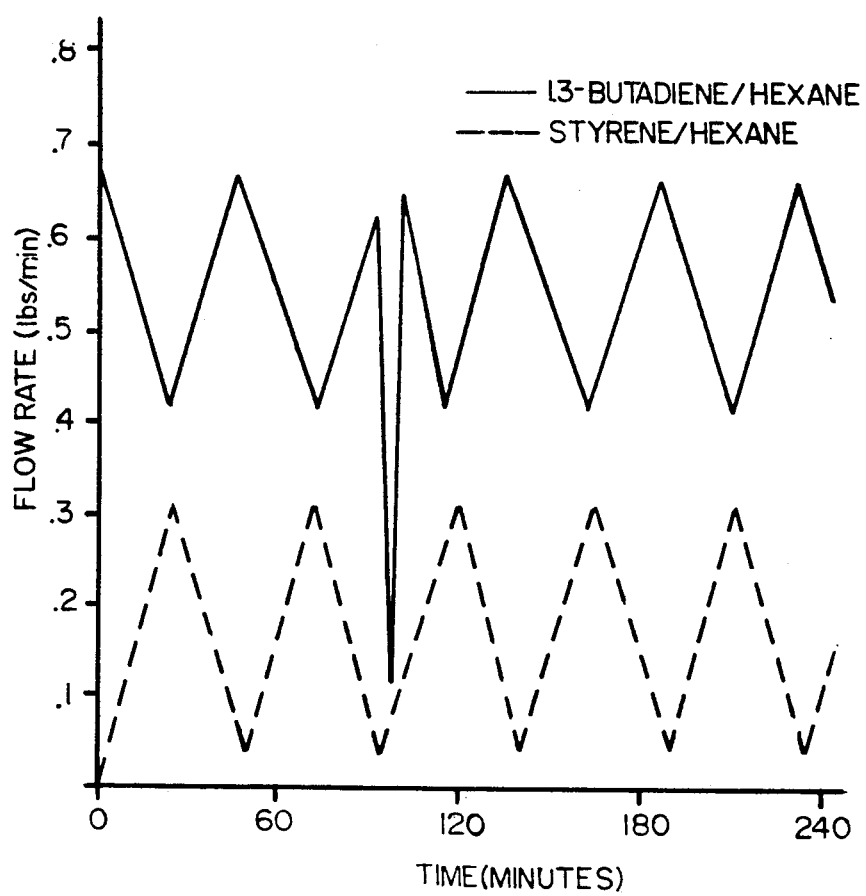
FIG. 1 graphically shows the cyclic monomer flow rates versus time in the production of the tapered block copolymers as displayed in Example 1.

The process of the present invention continuously charges the following metered streams into a stirred reactor: (1) a diene in a solvent, preferably 1,3-butadiene in hexane; (2) a vinyl aromatic monomer in a solvent, preferably styrene in hexane; (3) an optional solvent stream, preferably hexane; (4) an anionic initiator, preferably n-butyllithium in hexane; and (5) a modifier/solvent blend, preferably OOPS in hexane. Preferably the anionic initiator and the modifier/solvent streams are combined prior to charge into the reactor. Alternatively, the solvent stream can be charged solely with the reactants.

The reactive monomers, solvent, anionic initiator and modifier can be charged into the reactor through two or more, preferably three or more streams. It is desirable to add the anionic initiator and the modifier in one or two feed streams separate from the monomer feed streams to prevent any premature in-line reactions.

The tapered copolymers prepared in accordance with the invention are prepared by the copolymerization of conjugated dienes monomers and vinyl-substituted aromatic monomers. Polymerizable 1,3-diene monomers that can be employed in the production of the tapered copolymers of the present invention are one or more 1,3-conjugated dienes containing from four to twelve, inclusive, carbon atoms per molecule. Exemplary monomers include 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkyl-1,3 butadienes, it is preferred that the alkyl groups contain from one to three carbon atoms. The preferred 1,3-diene monomer for use in the process of the present invention is 1,3-butadiene. The conjugated diene is continuously charged into the reactor in a suitable diluent in amounts ranging between 0 to 100 percent by weight of the instantaneous total monomer feed, preferably cyclicly varying amounts.

In addition to the above-described conjugated dienes, inversely varying amounts ranging between 0 to 100 percent by weight of the instantaneous total monomer feed of one or more copolymerizable monomers such as vinyl-substituted aromatic monomers, hereinafter vinyl aromatic monomers, are continuously metered in a suitable diluent into the polymerization reactor. Examples of suitable copolymerizable monomers for use in the preparation of tapered copolymers in the present invention include: styrene; alpha-methylstyrene; 1-vinylnaphthalene; 2-vinylnapththalene; 1-alpha-methylvinylnaphthalene; 2-alphamethylvinylnaphthalene; and mixtures of these as well as alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; and 4,5-dimethyl-1-vinylnaphthalene. Occasionally, di- and tri- vinyl aromatic monomers are used in small amounts in addition with monovinyl aromatic monomers. The preferred vinyl aromatic monomer is styrene.

The monomers are continuously charged into the reaction vessel in a suitable inert organic diluent. Many suitable inert diluents are known in the art. Preferred diluents generally include alkanes and cyclo-alkanes. Suitable diluents include, but are not limited to: ethane, propane, iso- and n-butane, iso- and n-pentane, iso- and n-hexane, iso- and n-heptane, iso- and n-octane, cyclobutane, cyclopentane, cyclohexane, cycloheptane and cyclooctane. Preferred diluents are iso- and n-hexane. The diluents can be employed either alone or in admixture. The concentration of monomer in diluent can range from 5 to 60 wt. percent or more, and is generally dependent upon economics and the ability to control reaction conditions and to handle the polymer solution.

Any anionic initiator that is known in the art as useful in the copolymerization of diene monomers with vinyl aromatic monomers can be employed in the process of the instant invention. Suitable organo-lithium catalysts include lithium compounds having the formula $R(Li)_x$, wherein R represents a hydrocarbyl radical of 1 to 20, preferably 2 to 8 carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R groups for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methylcyclopentylethyl, cyclopentyl, dimethylcyclopentyl, ethylcyclopentyl, methlcyclohexyl, dimethylcyclohexyl, ethylcyclohexyl, isopropylcyclohexyl, and the like.

Specific examples of other suitable lithium catalysts include: p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines and the like.

Other suitable anionic initiators include alkali metal trihydrocarbyl magnesiates, preferably lithium, sodium or potassium trihydrocarbyl magnesiate compounds represented by the structural formula:

$MR_1R_2R_3Mg$ wherein M is Li, Na or K, and $R_1$, $R_2$, $R_3$ are independently selected from the group consisting of a $C_2$–$C_{14}$ hydrocarbon organo radical. These $C_2$–$C_{14}$ organo radicals may be alkyl, aryl, cycloalkyl, cycloalkenyl-alkyl, aryl-alkyl, aryl-cycloalkyl, cycloalkylaryl, or ethylenically unsaturated organo radicals such as vinyl, allyl and propenyl. The preferred organo radicals $R_1$, $R_2$ and $R_3$ which can be employed in the present invention are n-hexyl, n-butyl, s-butyl, 2-ethylhexyl and n-octyl.

The preferred $MR_1R_2R_3Mg$ compounds for use in the present invention include sodium tri-n-hexyl magnesiate, sodium tributyl magnesiate, sodium dibutylhexyl magnesiate, and sodium butyl-octyl-2-ethylhexyl magnesiate. Mixtures of different sodium or potassium trihydrocarbyl magnesiates can be employed in the anionic initiation systems. The use of an alkali metal trihydrocarbyl magnesiate serves to randomize styrene during copolymerization with 1,3-butadiene type monomers while maintaining a constant vinyl content, typically between 12% and 30%, in the butadiene contributed units.

Mixtures of lithium-based and magnesiate anionic initiators can also be employed. The preferred catalysts for use in the present invention are n-butyllithium and sodium n-butyl-n-octyl-2-ethyl-hexyl magnesiate and mixtures thereof.

The anionic initiator is continuously charged into the reactor in a ratio of millimoles of anionic initiator to the weight of monomers which are employed in the preparation of tapered block copolymers of the present invention in a catalytically effective amount ranging between 0.20 to 20.0 millimoles of anionic initiator per hundred grams of total monomer currently being charged into the reactor.

A 1,2-microstructure controlling agent or randomizing modifier is preferably used to control the 1,2-microstructure in the diene monomer contributed units and to randomize the amount of vinyl aromatic monomers, such as styrene, incorporated with the diene monomer, such as butadiene, in the rubbery phase. Suitable modifiers include, but are not limited to, tetramethylethylenediamine (TMEDA), oligomeric oxolanyl propanes (OOPS), 2,2-bis-(4-methyl dioxane) (BMD), tetrahydrofuran (THF), bistetrahydrofuryl propane and the like. One or more randomizing modifiers can be used. The amount of the modifier to the weight of monomers continuously metered into the reactor can vary during each cycle of monomer charge in a range from a minimum as low as 0 to a maximum as great as 400 millimoles, preferably 0.01 to 300.0 millimoles, of modifier per hundred grams of monomer currently being charged into the reactor. As the modifier charge increases, the percentage of 1,2-microstructure increases in the diene monomer contributed units. The ratio of modifier to weight of monomer feed into the reactor can be continuously adjusted to increase or decrease the 1,2-microstructure of the tapered copolymer currently being polymerized.

The process of the invention is carried out in a continuous polymerization reactor for anionic polymerization as a continuous feed process. As the reactants are used up almost immediately upon their addition, minimal unreacted reactant is present in the reaction vessel at any time.

A reaction vessel is precharged with hexane at approximately 100° F. to 200° F. prior to the initiation of continuous feeding of reactants via standard precharging techniques. Typical precharging of the reaction vessel includes the charging of solvent in an amount to fill the reactor.

The flow rates of all of the reactants are separately metered as they flow into the reaction vessel and it is within the contemplation of the invention that all flow rates and monitoring be controlled by computer. A tapered copolymer is withdrawn from the reactor as a solvent cement, preferably a hexane cement as the polymerization process proceeds.

As polymerization in the reactor is exothermic the reaction can be conducted at 150° to 350° F., preferably 200° to 300° F. with a residence time in the reactor of 0.3 to 6.0 hours, preferably about 0.5–1.0 hours.

Since the total monomer charge into the reactor is at a substantially constant rate, tapering is controlled by changing the ratio of the diene and vinyl aromatic monomer charge rates. During each cycle in the reaction residence time, the percentage by weight of the vinyl aromatic monomer in the overall monomer charge incrementally increases from a minimum amount in a minimum charge range between about 0 to 15% by weight of the current total reactor monomer charge to a maximum amount in a maximum charge range between about of 30 to 100% by weight and then back to the initial minimum charge range. The corresponding percentage of diene monomer by weight in the initial overall monomer charge during a cycle incrementally inversely changes from an initial charge ranging from 100% to 85% by weight of the overall monomer charge to a minimum charge ranging from 0 to 70% by weight and back to a maximum charge.

As the charged amount of diene is continuously decreased until the increasing charge of vinyl aromatic monomers equals a maximum charge rate between 30 to 100% by weight of the total monomer charge, tapered blocks containing increasingly higher vinyl aromatic monomer contributed units are produced. At this point in the reaction, the weight percentage of the vinyl aromatic monomer charge is continuously reduced while the weight percentage of the diene monomer charge is correspondingly increased. For purposes of this invention monomer charge is defined as the amount of monomer flowing into reactor at a specific point in time. Thus, if X% represents the amount by weight percent of vinyl aromatic monomer, hereinafter discussed as styrene, of the total monomer charge continuously being charged into the reactor, then (100-X)% represents the amount by weight percent of diene monomer charge, hereinafter discussed as butadiene, continuously being charged into the reactor in the formation of styrene-butadiene block copolymers.

In a preferred embodiment of the present invention, the value of X% changes from a minimum charge between (0 to 15)% gradually up to a maximum charge between (35 to 100)% and then gradually reduced down to a minimum charge between (0 to 15)% before cyclicly repeating approximately the same incremental changes. By continuously varying the weight ratio of butadiene to styrene in the reactor charge, the process of the present invention continuously produces a mixture of varying tapered styrene-butadiene block copolymers so that the final recovered mixture of tapered styrene-butadiene block copolymer possesses varying $T_g$ values and is suitable as an ideal rubber tread composition. Although residence time in the reactor can be effected by various reaction conditions, it is desirable that one complete monomer charge cycle be charged into the reactor in a time between 20 to 80 minutes, preferably 40 to 50 minutes. The monomer charge cycle is defined as the time period it takes for a specific monomer feed rate to start and then return to a minimum or maximum feed rate. Since the present process is continuous, it can be utilized to produce tapered copolymers employing 2 to 1,000,000 repeated monomer charge cycles.

The present process constantly changes the vinyl aromatic monomer to diene monomer feed ratio into the reactor while the modifier to initiator feed ratio into the reactor is either maintained as constant or is also cyclicly adjusted during the course of the polymerization. The combination of polymerization temperature, flow rate, cyclicly changing modifier concentration, and cyclicly changing vinyl aromatic monomer feed to diene monomer ratio results in a random, tapering styrene-butadiene copolymer.

The feed ratio of modifier to anionic initiator into the reactor can be incrementally increased and decreased to provide an increasing 1,2-microstructure percentage in diene contributed units along the backbone chain during each monomer feed cycle preferably in a molar ratio ranging between 0 and 5 moles of chelating modifier per mole of anionic initiator and between 0 and 400 moles of non-chelating modifier per mole of anionic initiator.

Process conditions such as the initial and maximum temperature of the polymerization reaction can independently effect the final 1,2-microstructure content of the 1,3-diene copolymers or polymers. These conditions can be controlled for each monomer reaction system to produce the final desired average 1,2-microstructure content of from about fifteen (15) to forty (40) percent. It is desirable to produce polymers and copolymers having an average 1,2-microstructure between 20 and 35 percent in the 1,3-diene monomer contributed units. The 1,2-microstructure of the copolymers produced in accordance with the process of the present invention preferably continually gradually increases along the growing chain (as the styrene content increases) due to the increasing and decreasing concentration of modifier present in the reaction medium as the reaction proceeds. The percentage 1,2-microstructure along the backbone segments of the copolymers can increase from about 10% to about 90% along the backbone chain. Preferably, the 1,2-microstructure gradually increases from a 10% to 30% average at the low side or first 30 percentile of polymer chain length to about a 30% to 70% average at the high side or the terminal 30 percentile of chain length. The average 1,2-microstructure in the first 30 percentile in the chain length of the polymer is preferably at least 15 to 20 percent lower than the average 1,2-microstructure in the terminal 30 percentile of the chain length of the polymer. The 1,2-microstructure can also be constant by maintaining the modifier to anionic initiator molar ratio at a set value of 0/1 to 400/1.

The term 1,2-microstructure as used in the present invention actually refers to the mode of addition of a growing polymer chain with a conjugated diene monomer unit. Either 1,2-addition or 1,4-addition can occur. For simplicity, the terms vinyl content or 1,2-microstructure are employed to describe the microstructure resulting from the 1,2-addition of conjugated dienes.

The total block copolymer of the present invention can be represented by the structural formula:

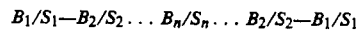

wherein n=10 to 2500. This formula represents the ideal model of a tapered styrene-butadiene block copolymer formed during one full monomer charge cycle in the reactor. B/S represents a butadiene (B) - styrene (S) block copolymer and $B_1/S_1$ represents the initial block formed containing 0 to 15% by weight of styrene and 100 to 85% by weight of butadiene. The percentage of styrene in each block gradually increases such that $\%S_1 < \%S_2 < \%S_n$; and the block of $B_n/S_n$ contains from 30 to 100% by weight of styrene and 70 to 0% by weight of butadiene, i.e. $\%S_n$=between 30 to 100%, $\%B_n$=70 to 0%, and $\%B_n + \%S_n$=100% of total monomer feed.

The tapering rate of the polymer is calculated by measuring the conversion rate and the styrene content at certain stages during the copolymerization reaction. The difference in the styrene content at two points in the chain is calculated, and the tapering rate is given by the following equation:

$$\text{Tapering rate} = \frac{\text{Differences in the styrene content at two points in the chain}}{\text{Percentage of the weight of the chain portion to the weight of the total chain}}$$

The structure of the tapered styrene-butadiene copolymer can be confirmed by the calculated tapering rate. It is preferred that the mixture of copolymer chains produced by the present process contains an average tapering rate of between about 0.30 to 1.70 and a styrene block rate % (separated block styrene polymer weight×100/total copolymer weight) of less than 10 percent.

It is further understood that a large mixture of various block copolymers is produced in accordance with the continuous process of the present invention. The various block polymers can have as an initial block and terminal block segment any block length segment intermittently along a $$B_1/S_1 \ldots B_n/S_n \ldots B_1/S_1 \ldots B_n/S_n \ldots B_1/S_1 \ldots \text{etc.}$$

Thus the styrene content in the tapered blocks along the chain length can increase only, decrease only, increase then decrease, decrease then increase, decrease then increase then decrease, increase then decrease the increase, etc.

In a preferred embodiment the (B/S) tapered block segments of the total block copolymer preferably contain an average of 15 to 40%, preferably 20 to 25%, of 1,2-microstructure along the polymer chain length. In another preferred embodiment the average 1,2-microstructure along the copolymer chain preferably varies at least 10% between each of the three segments identified as the initial 30 percentile, the middle 40 percentile and the terminal 30 percentile of chain length of the (B/S) tapered copolymer.

A large mixture of tapered block copolymers are present in the copolymers prepared in accordance with the process of the invention since various tapered blocks are continuously prepared in accordance with the present process. The continuously produced tapered copolymers have a broad glass transition temperature or a series of very small and ill-defined glass transition temperatures. In a preferred embodiment, the diene monomer is 1,3-butadiene and the vinyl aromatic monomer is styrene. The copolymers prepared in accordance with the invention have molecular weights between 50,000 and 550,000, preferably between 100,000 and 350,000 and possess an average of 20 to 50 percent by weight of vinyl aromatic monomer contributed units and 80 to 50 percent of diene contributed units.

The continuous charge of vinyl aromatic monomer, preferably styrene, into the reactor can also be maintained at increasing or decreasing charged amounts; thereby producing a tapered block copolymer having an increasing or decreasing styrene content or other vinyl aromatic monomer contributed content, while optionally tapering the 1,2-microstructure in accordance with the previously defined procedures. Thus the process of the present invention can be utilized to prepare tapered copolymers having: (1) both a tapered vinyl aromatic monomer content and a tapered 1,2-microstructure per sequential block formation, (2) a tapered 1,2-microstructure and an increasing then decreasing vinyl aromatic monomer content per sequential block formation, (3) a tapered vinyl aromatic monomer content and a constant 1,2-microstructure per sequential block formation and (4) a tapered vinyl aromatic monomer content and an increasing then decreasing 1,2-microstructure content per sequential block formation.

As described, the diene monomer, vinyl aromatic monomer and modifier and initiator are added via separate feed streams into the polymerization reactor. The monomer ratios are cyclicly varied through the course of the reaction while the modifier level can cyclicly vary or be maintained. A rise in modifier level yields an increase in vinyl content and also aids in encouraging random addition of vinyl monomer to the copolymer.

The copolymers and polymers produced in accordance with the present invention are useful in the manufacture of tire treads as well as other molded rubber goods.

The following examples are presented for purposes of illustration only and are not to be construed in a limiting sense. All percentages are by weight unless otherwise identified.

EXAMPLE 1

A tapered styrene-butadiene copolymer is prepared in accordance with the continuous feed process of the present invention. A five gallon reactor is precharged to capacity with hexane. Five feed streams having the following concentrations were fed into the bottom of the reactor: (1) 25.2% of styrene in hexane, (2) 24.65% of 1,3-butadiene in hexane, (3) 0.143 mM/cc of n-BuLi in hexane, (4) 0.30 mM/cc of OOPS in hexane, and (5) additional hexane.

The desired conditions of this polymerization process were (1) an average styrene level in the copolymer of 25% by weight, (2) a ratio of OOPS modifier/Li of 0.50, (3) an average molecular weight of 150,000 and (4) an average residence time in the reactor of 46 minutes.

The flow rates of the charge into the reactor were:

| Stream | cc/HR | cc/Min | GMS/HR | LBS/HR |
|---|---|---|---|---|
| Styrene/Hexane | 7131 | 118.8 | 4710 | 10.4 |
| Butadiene/Hexane | 21887 | 364.8 | 14456 | 31.9 |
| Hexane | 10192 | 169.9 | 6726 | 14.8 |
| n-BuLi | 295.2 | 4.92 | 194.8 | 0.43 |
| n-BuLi for impurities | 73.8 | 1.23 | | |
| OOPS | 703.5 | 11.72 | 464.3 | 1.02 |
| Total | 40282.5 | 671.4 | 26551.1 | 58.55 |

While the flow rate of the catalyst and modifier feed streams remained constant, the flow rate of the monomer feed streams was adjusted every second as displayed in FIG. 1. The flow rates of the monomers was computer controlled in a 46 minute cycle. The maximum flow of 1,3-butadiene monomer was added to the reactor every forty-six minutes corresponding to the minimum flow of styrene monomer. The flow of the 1,3-butadiene monomer progressively decreased in a twenty-three (23) minute cycle while the flow rate of the styrene monomer correspondingly increased to its maximum. In the remaining twenty-three minutes of every monomer feed cycle, the 1,3-butadiene monomer feed progressively increased to the maximum feed rate while the styrene monomer feed rate correspondingly decreased. The feed cycles were then repeated as shown in FIG. 1.

It is noted that a ruptured disk in the flow line of the 1,3-butadiene at the 93 minute temporarily reduced the desired 1,3-butadiene monomer flow rate.

The tapered block copolymer product continuously recovered from the reactor had the recovered catalyst deactivated with water, an antioxidant was added, and the copolymer was dried and recovered.

Figure 2:
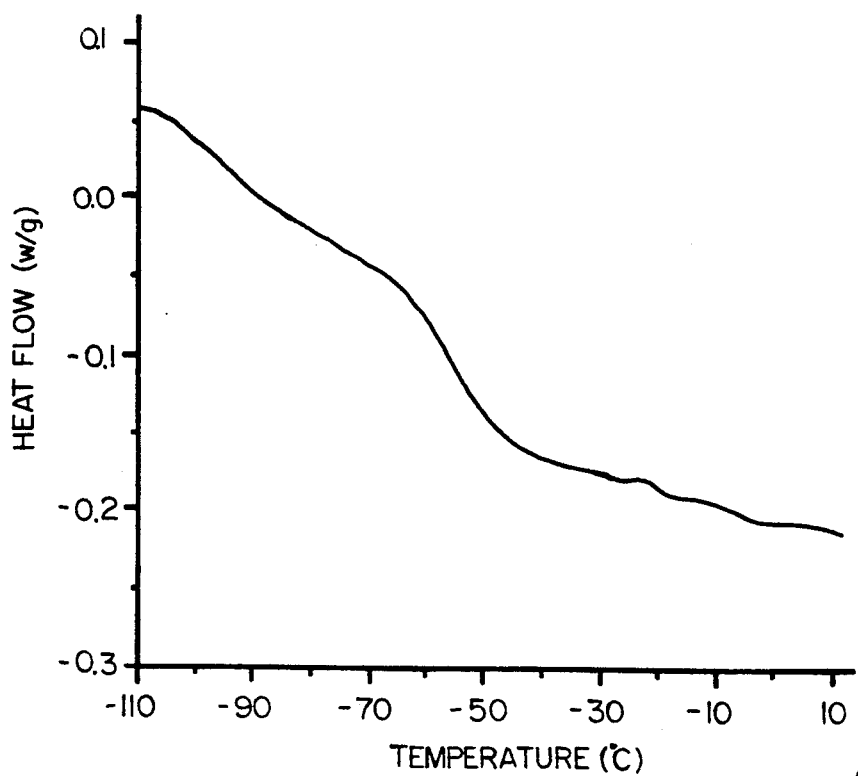
FIG. 2 show the $T_g$ of the tapered block copolymers produced in Example 1.

The recovered tapered block copolymer displayed a broad $T_g$ on a DSC (differential scanning colorimeter) as displayed in FIG. 2. The recovered copolymer displayed the following properties:

ML-4@100° C.=67
$M_n$=106,000
$M_w$=460,000
$M_w/M_n$=4.4
% Styrene content=23.5% with no block styrene (10 or more units)
% 1,2-microstructure=28.6%

The common equivalent of the block copolymers produced in accordance with the process of the present invention is that these block copolymers are tapered and possess a broad $T_g$ or a series of small $T_g$'s, thus being devoid of a sharply defined glass transition temperature. As shown in FIG. 2, only an ill-defined glass transition temperature is identifiable for the tapered block copolymer produced in Example 1 in accordance with the monomer flow rates shown in FIG. 1.

We claim:

1. A continuous process for the preparation of a tapered copolymers formed by the polymerization of conjugated diene and vinyl aromatic reactive monomers comprising continuously injecting into a reaction vessel:
    a. the first stream comprising the conjugated diene monomer in a solvent,
    b. the second stream comprising the vinyl aromatic monomer in a solvent,
    c. a catalytically effective amount of an anionic initiator, and
    d. 0 to 400 millimoles of a randomizing modifier per hundred grams of monomer;
    wherein during the course of polymerization the present by weight of the diene monomer of the total monomer weight being charged into the reaction vessel is (100-X)%, wherein X% represents the weight percent of the vinyl aromatic monomer being charged into the reaction vessel and wherein X% cyclicly ranges between a minimum charge between about 0 to 15% t a maximum charge between about 35 to 100% and X% constantly changes during polymerization so that the produced tapered copolymers are devoid of a sharply defined glass transition temperature.

2. The process as defined in claim 1 wherein the conjugated diene monomer is 1,3-butadiene.

3. The process as defined in claim 1 wherein the vinyl aromatic monomer is styrene.

4. The process as defined in claim 1 wherein the solvent comprises hexane.

5. The process as defined in claim 1 wherein the tapered structure of the tapered copolymer is controlled by rate varying in a predetermined manner between limits of 100 to 0 percent by weight of diene monomer and 0 to 100 percent by weight of a vinyl aromatic monomer during repeated cycles, each cycle being no longer than one residence time.

6. In a continuous copolymerization process having a substantially constant percent by weight of total monomer charge rate comprising 0 to 100 percent by weight a vinyl aromatic monomer and 100 to 0 percent by weight of a conjugated diene monomer in a reaction zone in contact with a solvent and an anionic initiator under polymerization conditions and a residence time of 0.3 to 6.0 hours wherein the glass transition temperature of the tapered block copolymer is controlled to have no sharply definable glass transition temperature by constantly varying the flow rates of the monomers into the reactor at a predetermined varying rate during repeated cycles, the flow rates of the monomers inversely varying in a predetermined manner during each of the cycles from a minimum to a maximum or a maximum to a minimum, the cycles being substantially equal in length with each cycle length varying from minutes to one residence time, while continuously withdrawing a tapered block copolymer from the vinyl aromatic monomer and the conjugated diene monomer from the reaction zone.

7. A process in accordance with claim 6 wherein the vinyl aromatic monomer feed rate varies during each cycle from a minimum of 0 to 15 percent by weight of the total monomer charge to a maximum of 30 to 100 percent by weight of the total monomer charge back to the minimum.

8. The process in accordance with claim 7 wherein the remaining weight percentage of the total monomer feed comprises a conjugated diene monomer.

9. The process in accordance with claim 6 additionally comprising the step of controlling 1,2-microstructure of the tapered copolymer by introducing a 1,2-microstructure modifier at a rate varying in a predetermined manner between limits of 0 to 400 millimoles per millimole of anionic initiator.

10. A tapered copolymer prepared in accordance with the process of claim 6.

11. An elastomer composition comprising:
    a mixture of tapered block styrene-butadiene copolymers having an average styrene content of 15 to 50 percent by weight
    said mixture being devoid of a specific glass transition temperature and having an average molecular weight between 50,000 and 550,000.

12. The elastomer composition as defined in claim 11 wherein said styrene-butadiene copolymers contain an average tapering rate between about 0.30 to 1.70.

* * * * *

UNITED STATES PATENT AND TRADEMARK OFFICE
CERTIFICATE OF CORRECTION

PATENT NO. : 5,272,207
DATED : Dec. 21, 1993
INVENTOR(S) : JAMES E. HALL, et al.

It is certified that error appears in the above-indentified patent and that said Letters Patent is hereby corrected as shown below:

Column 9, line 46 "t a maximum" should be --to a maximum--.

Signed and Sealed this

Fifth Day of July, 1994

Attest:

BRUCE LEHMAN

Attesting Officer

Commissioner of Patents and Trademarks